April 30, 1935. A. BARATELLI 1,999,748
DEVICE FOR THE CORRECT STEERING OF TRAILERS
Filed Feb. 12, 1934
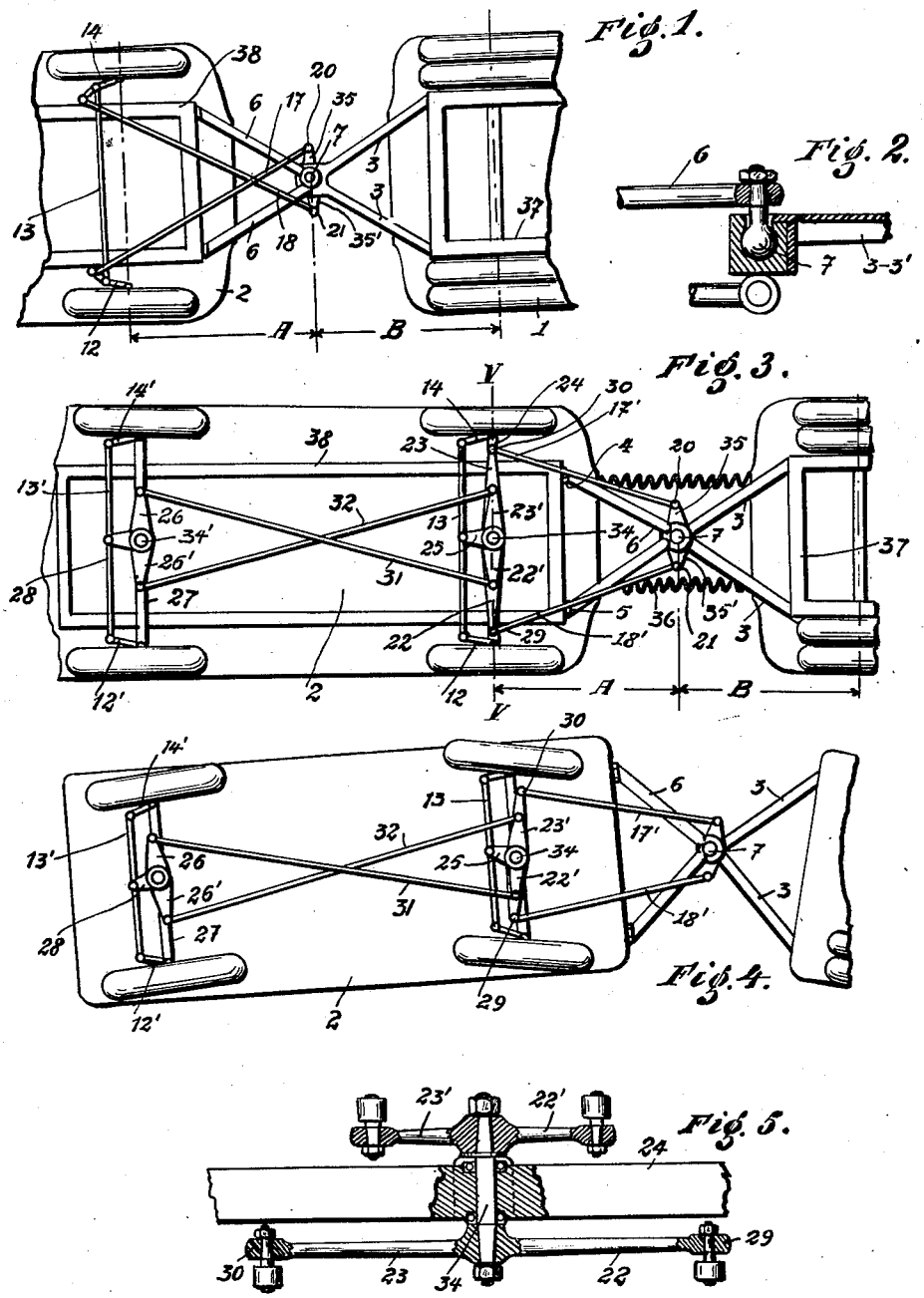

Patented Apr. 30, 1935

1,999,748

UNITED STATES PATENT OFFICE 1,999,748

DEVICE FOR THE CORRECT STEERING OF TRAILERS

Ambrogio Baratelli, Varese, Italy

Application February 12, 1934, Serial No. 710,939
In Italy February 16, 1933

4 Claims. (Cl. 280—33.5)

The object of the present invention is to provide a device for the correct steering of trailers in road convoys which, unlike other devices heretofore in use, enables the convoy to be run backward and allows of fitting a connecting gangway between two vehicles which are coupled together, and thereby form a road convoy consisting of two or more vehicles all of which are in communication with one another.

The invention essentially consists:

(a) In coupling two adjacent vehicles by means of two angular frames, one of which is fixed to the rear cross-bar of the underframe of one of the vehicles to be coupled, whilst the other frame is hinged to the front cross-bar of the underframe of the other vehicle to be coupled so as to allow oscillation about a horizontal axis, the apexes of the two frames being connected by means of a universal joint coupling or similar coupling the centre of oscillation of which is positioned midway between the adjacent axles of the vehicles to be coupled.

(b) In an arrangement for controlling the steering mechanism of the pivoting front-axle of a trailer simultaneously with the steering displacements of the towing motor-vehicle, the arrangement comprising a linkage, one end being pivotally connected to the steering mechanism of said pivoting front-wheels of the trailer and the other ends to two points or studs fixed relatively to the angular frame fixed in turn to the towing vehicle, said two studs being equidistant from the centre of oscillation of the coupling above referred to.

(c) In an improved arrangement for simultaneously operating the correct steering of all the pivoting wheels of a trailer, the trailer being connected by means of a universal joint connection or the like to a towing vehicle comprising two horizontal levers keyed at their mid-points to two vertical shafts each pivotally mounted at the centre of each of the two axles of the trailer; two links crossing one another each of which pivotally connects one end of one of said horizontal levers with the diametrically opposite end of the other horizontal lever, two arms projecting toward the rear from the centre points of each of the two levers, the rear end of each of the said arms being connected with the corresponding drag-link connecting the steering pivots of the corresponding pair of wheels; a third horizontal lever keyed at its mid-point to one of the said vertical shafts which is pivotally mounted at the centre point of the front axle of the trailer; two arms fixed parallel to the cross-bar of the underframe of the towing vehicle and radially arranged with respect to the centre coupling; and two other links, that do not cross one another, pivotally connecting the ends of the said arms by the studs with the ends of the said third horizontal lever.

It will be seen that by this arrangement the convoy may be run backwards since the trailer is positively steered by the towing, or in this case, the pushing vehicle.

The accompanying drawings illustrate, diagrammatically and by way of example only, two embodiments of the invention.

Figure 1 shows a plan view of a steering and coupling device adapted to control only the front wheels of a trailer.

Figure 2 shows, in vertical longitudinal section, a detail of a constructional form of a ball-joint connection to be arranged between the two vehicles.

Figure 3 shows an improvement of the steering and coupling device shown in Figure 1 and adapted to control the front and rear wheels of a trailer.

Figure 4 is a view similar to Figure 3 showing the steering device in operation on a curve.

Figure 5 shows, on an enlarged scale, a vertical section along the line V—V in Figure 3, the wheels and the end portions of the wheel-axle being broken away.

Referring to the drawings, 1 indicates the rear part of a towing vehicle and 2 shows the front part of a trailer.

To the rear cross-bar of the underframe 37 of the towing vehicle 1 an angular horizontal frame 3—3 is fixed. To the front cross-bar of the underframe 38 of the trailer 2 another angular frame 6—6 is connected by means of hinges or ball-joints 4 and 5 (Fig. 3) so that this frame may oscillate about a horizontal axis. The connection between the two frames 3—3 and 6—6 is realized by means of a universal joint coupling 7 (for instance a ball or similar joint, Figure 2), one member of this joint being fitted to the apex of one of said angular frames, whilst the other member is fitted to the apex of the other angular frame.

The universal joint coupling 7 is so arranged as to have its center of oscillation lying midway between the rear-axle of the towing vehicle and the front axle of the trailer, A—B in Figs. 1 and 3.

It is understood that, in practice, the angular frame 3—3, instead of being solid with the rear cross-bar of the underframe 37 of the towing vehicle 1, may be hinged to the same cross-bar, and that, consequently, the angular frame 6—6 can be made rigid with the front cross-bar of the underframe 38 of the trailer 2, instead of being hinged to this latter mentioned cross-bar.

To the apex of the angular frame 3—3 regardless of whether it is rigidly connected or hinged to the rear cross-bar of the underframe of the towing vehicle 1 are rigidly fixed two short arms 35, 35', which are parallel to said cross-bar and radially arranged with respect to the universal joint coupling 7.

All above said members and parts are like numbered in all Figures 1 to 4 inclusive.

Referring now to the construction illustration in Figure 1, adapted, as above stated, to control only the steering of the front-wheels of a trailer 2, there are shown two links 17 and 18, crossing one another. Said links are pivotally attached to the studs 20 and 21 mounted in the arms 35 and 35', and the other ends of the links are directly attached to projections of the levers 14 and 12 respectively, of the trapezoidal steering mechanism 12, 13, 14 of the front wheels of the trailer 2.

Referring now to the improved construction shown in Figures 3, 4 and 5, adapted to control the steering of all four wheels of the trailer 2 (or of a second trailer), two links 17' and 18' (which do not cross one another) are pivotally attached, at their ends to the ends 20 and 21 of the arms 35 and 35', while at their other ends they are attached to the ends 30 and 29, respectively, of a horizontal lever 23—22 keyed at its midpoint on a vertical shaft 34 (Figure 5) pivotally mounted at the centre of the front-wheel axle 24 of the trailer 2.

22' and 23' is another horizontal lever also keyed at its midpoint on said shaft 34. The longitudinal axes of the two levers 23—22 and 22'—23' lie in a single vertical plane. From the middle point of the lever 22'—23' an arm 25 projects rearwardly the rear-end of which is pivotally connected, for instance by means of a pin and slot connection, to the drag-link 13 of the steering mechanism of the trailer 2.

26—26' is a third horizontal lever keyed on another vertical shaft 34' pivotally mounted to the centre of the rear-axle 27 of the trailer 2. Like the lever 22'—23' from the middle point of the lever 26—26' an arm 28 projects rearwardly, the end of which is pivotally connected, for instance by means of a pin and slot connection, to the drag-link 13' of the steering mechanism 12'—13'—14' of the trailer 2.

A link 32 pivotally connects the extremities of the lever-arms 23' and 26', while another link 31, crossing the lever 32, pivotally connects the extremities of the lever-arms 22' and 26.

It is understood that the lever 22'—23' may be omitted and that, in this case, the front ends of the links 31 and 32 will be directly connected to the lever 22—23 equidistant from the center of rotation of this latter lever and at points diametrically opposite to the ends of the lever 26—26' to which the rear ends of the links 31 and 32 are connected.

It is also to be understood that the links 31 and 32 may also be applied to the construction specified and illustrated in Figure 1. In this case one of the links will connect the projection of the lever 14 of the front steering mechanism with the projection of the diametrically opposed lever of the rear steering mechanism, whilst the other link will connect the projection of the lever 12 of the front steering mechanism with the projection of the diametrically opposed lever of the rear steering mechanism.

By means of the steering device above described and illustrated in the drawing the movement of the trailer 2 is independent of the towing vehicle 1 in certain respects due to the position of the coupling 7 and to the hinge connection of one of the frames 3—3 and 6—6. Also with the said steering device it is possible to run the convoy backward further, since the coupling is arranged midway between the two adjacent axles of the two coupled vehicles, the side swinging of the trailer 2 on curves is completely done away with, so that it is also practical to provide a gangway 36 (see Fig. 3) with bellows, or the like, between the two coupled vehicles, the center of the gangway corresponding to the center of oscillation of the coupling 7, in such a manner that the elongation of one of the sides of the gangway on the curve is limited and not dangerous for the gangway itself, because the bending or folding of the bellows always takes place on the vertical central axis of the gangway. Finally, the arrangement of the steering operating members mounted on the trailer, and above specified with reference to Figures 3 to 5, inclusive, gives the very practical result that the wheels of the trailer follow the curves of the towing (or preceding) vehicle.

Having thus fully described the invention, what is claimed as new and desired to be secured by Letters Patent is:—

1. In a tractor and trailer construction having underframes and axles, a device for the steering of trailers the axles of which are stationary and each of which has thereon a pair of ground supported wheels, a trapezoidal steering mechanism for each pair of wheels pivotally mounted at the ends of each axle comprising a center universal joint connection between the tractor and trailer to be coupled and so arranged that its center of oscillation lies midway between the two adjacent axles of said tractor and trailer, members adjacent to and projecting from the adjacent cross bars of the underframes of said tractor and trailer, the parts constituting the universal joint being fitted at the meeting ends of said members, two studs diametrically and oppositely arranged with respect to said universal joint connection, these studs lying on a line parallel to the rear axle of the tractor and being carried by the end of said member projecting from the cross bar of the underframe of the tractor and connecting means between said studs and wheels of the trailer to obtain the correct veering of the wheels of the trailer, said connecting means being pivoted to said studs.

2. In a tractor and trailer construction having underframes and axles, a device for the steering of trailers the axles of which are stationary and each of which has thereon a pair of ground supported wheels, a trapezoidal steering mechanism for each pair of wheels pivotally mounted at the end of each axle, comprising a center universal joint connection between the tractor and trailer to be coupled and so arranged that its center of oscillation lies midway between the two adjacent axles of said tractor and trailer, two angular frames adjacent to and projecting from the adjacent cross bars of the underframes of said tractor and trailer, the parts constituting the universal joint coupling being fitted at the meeting ends of said angular frames, one of said frames being horizontal and firmly fitted to one of said cross bars while the other frame is hinge connected to the other cross bar, this latter connection being such as to permit the frame to oscillate about a horizontal axis, two studs diametrically and oppositely arranged with respect to said universal joint connection, these studs lying on a line parallel to the rear axle of the tractor, having equal length and being carried by the end of the angular frame projecting from the cross bar of the underframe of the tractor, and two links, crossing one another, one end of which is pivotally connected to the end on one of two arms each projecting from the wheel pivots and which form part of the trapezoidal steering mechanism of the front wheels of the trailer, while the other end of said links is pivotally connected to said studs.

3. In a tractor and trailer construction having underframes and axles, a device for the steering of trailers the axles of which are stationary and each of which has thereon a pair of ground supported wheels, a trapezoidal steering mechanism for each pair of wheels pivotally mounted at the ends of each axle, comprising a center universal joint connection between the tractor and trailer to be coupled and so arranged that its center of oscillation lies midway between the two adjacent axles of said tractor and trailer, two angular frames adjacent to and projecting from the adjacent cross bars of the underframes of said tractor and trailer, the parts constituting the universal joint being fitted at the meeing ends of said frames, one of said frames being horizontal and firmly fitted to one of the said cross bars, while the other frame is hinge connected to the other cross bar, this latter connection being such as to permit the frame to oscillate about a horizontal axis, two studs diametrically and oppositely arranged with respect to said universal joint connection, these studs lying on a line parallel to the rear axle of the tractor, having equal length and being carried by the end of the angular frame projecting from the cross bar of the underframe of the tractor, a horizontal rocking lever mounted at the middle point of the front axle of the trailer, another horizontal rocking lever mounted at the middle point of the rear axle of the trailer, arms projecting rearwardly from the middle points of the sides of each said two rocking levers, pivotal connection between the ends of said rearwardly projecting arms and the middle point of each of the drag-links of the trapezoidal steering mechanisms of the two pairs of wheels of the trailer, two links, which do not cross one another, connecting the ends of said first named rocking lever with said two studs, and two other crossing links each of which connects the end of an arm of one of said horizontal rocking levers with the end of the diametrically opposed arm of the other horizontal rocking lever, the four arms of said levers having equal length.

4. In a tractor and trailer construction having underframes and axles, a device for the steering of trailers the axles of which are stationary and each of which has thereon a pair of ground supported wheels, a trapezoidal steering mechanism for each pair of wheels pivotally mounted at the ends of each axle, comprising a center universal joint connection between the tractor and trailer to be coupled and so arranged that its center of oscillation lies midway between the two adjacent axles of said tractor and trailer, two angular frames adjacent to and projecting from the adjacent cross bars of the underframes of said tractor and trailer, the parts constituting the universal joint being fitted at the meeting ends of said angular frames, one of said frames being horizontal and firmly fitted to one of said cross bars, while the other frame is hinge connected to the other cross bar, this latter connection being such as to permit the frame to oscillate about a horizontal axis, two studs diametrically and oppositely arranged with respect to said universal joint connection, these studs lying on a line parallel to the rear axle of the trailer, having equal length and being carried by the end of the angular frame projecting from the cross bar of the underframe of the tractor, two horizontal rocking levers each of which is keyed on a separate vertical pivot mounted at the middle point of each of the two axles of the trailer, the four arms of said levers having equal length, a third horizontal lever keyed on said pivot mounted on the front axle of the trailer, the longitudinal arms of the levers keyed on this latter pivot lying in a single vertical plane, two links, which do not cross one another, connecting the ends of the said third named lever with said studs on the frame projecting from the rear cross bar of the underframe of the tractor, arms projecting rearwardly from the middle points of the sides of said first named two horizontal rocking levers, pivotal connections between the ends of said projecting arms and the middle points of the two drag-links of the trapezoidal steering mechanisms of the two pairs of wheels of the trailer, and two other crossing links each of which connects the end of an arm of one of the first-named two horizontal rocking levers to the end of the diametrically opposed arm of the other of said two horizontal rocking levers.

AMBROGIO BARATELLI.